S. V. DICKMAN.
PLANETARY TRANSMISSION.
APPLICATION FILED MAR. 28, 1917.
1,245,692.
Patented Nov. 6, 1917.
3 SHEETS—SHEET 1.
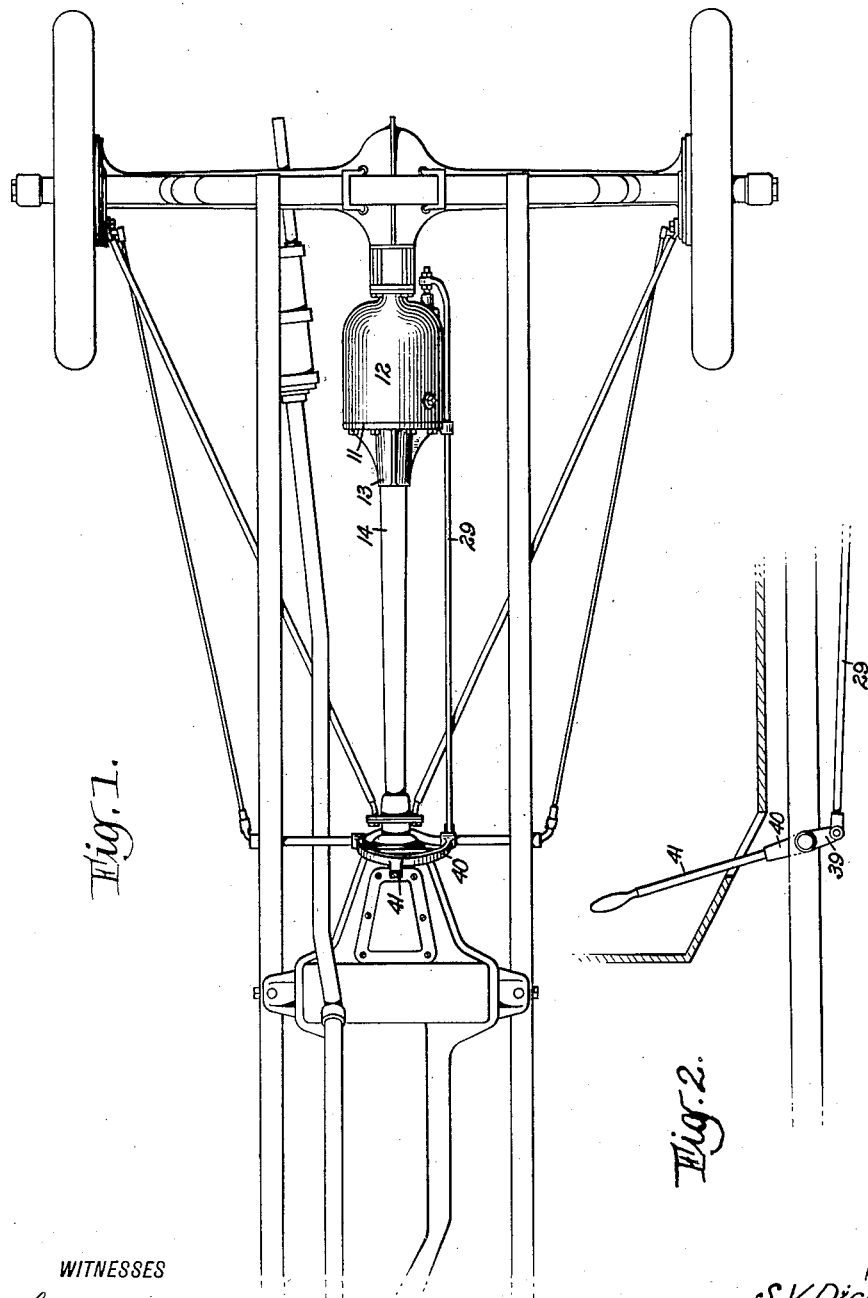
WITNESSES
Frederick Diehl.
B Joffe
INVENTOR
S. V. Dickman
BY
ATTORNEYS

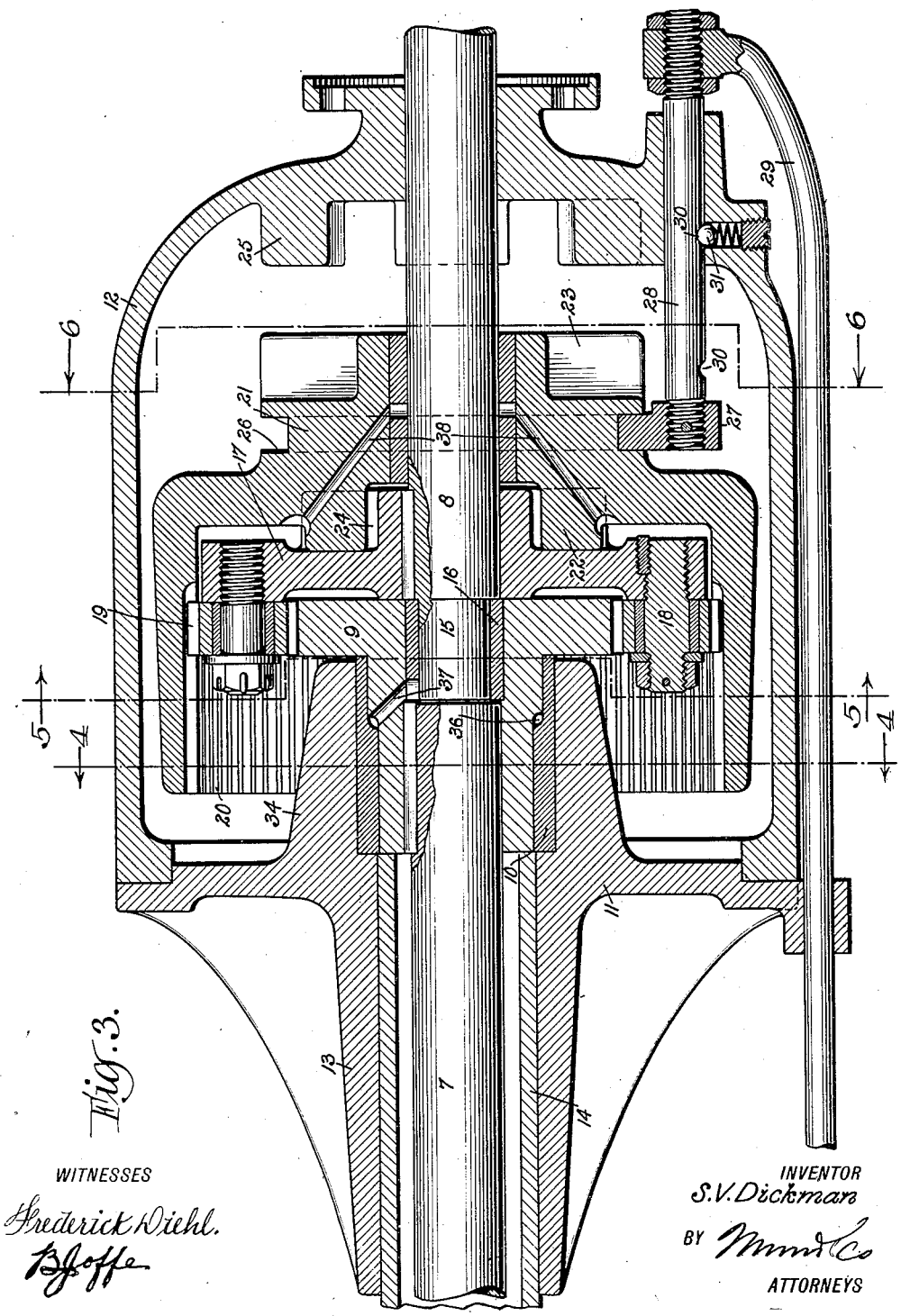

S. V. DICKMAN.
PLANETARY TRANSMISSION.
APPLICATION FILED MAR. 28, 1917.
1,245,692.
Patented Nov. 6, 1917.
3 SHEETS—SHEET 3.
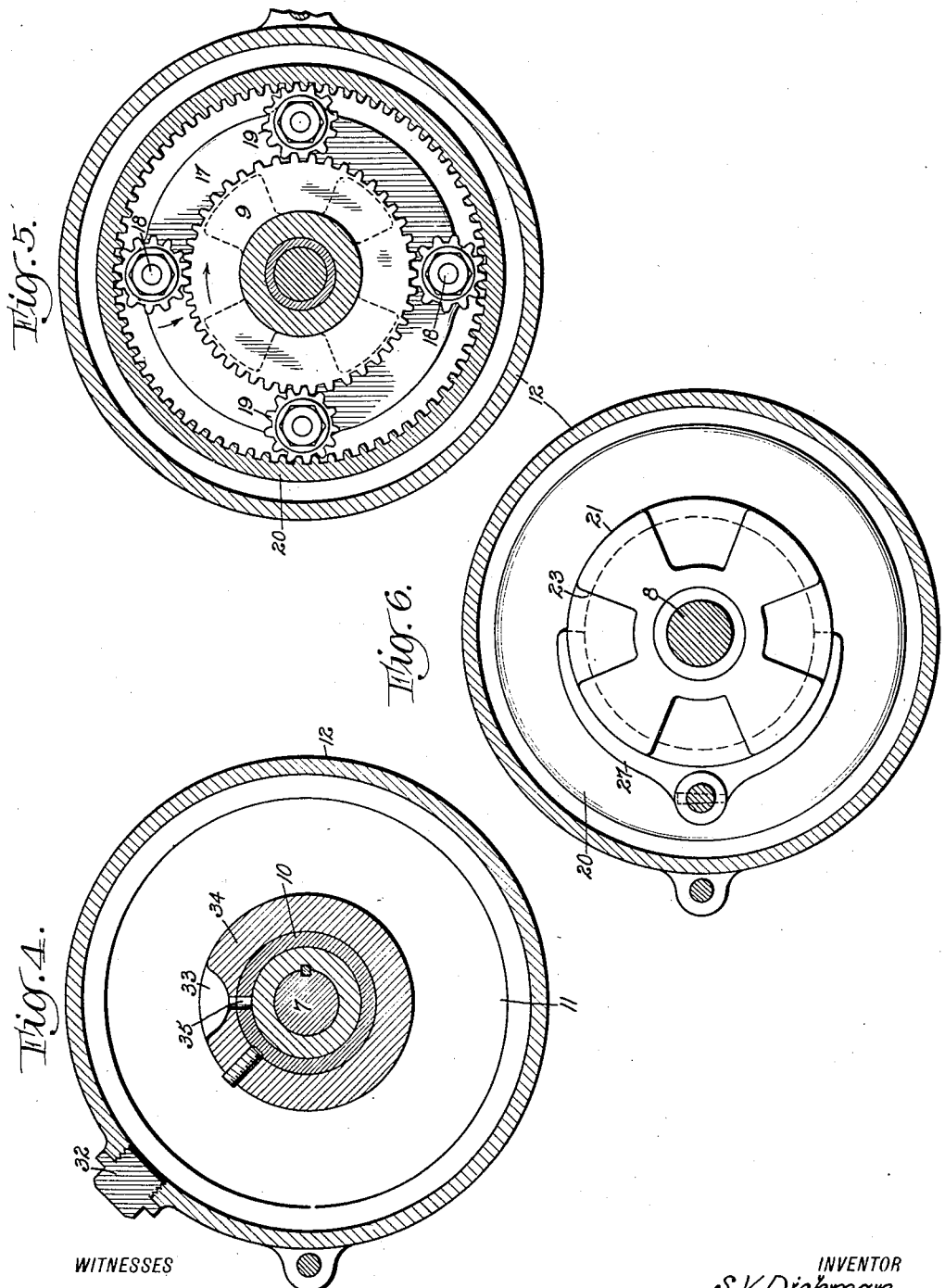
WITNESSES
Frederick Diehl.
B Joffe
INVENTOR
S. V. Dickman
BY
ATTORNEYS

UNITED STATES PATENT OFFICE.

SMITH V. DICKMAN, OF SHAVERTOWN, NEW YORK.

PLANETARY TRANSMISSION.

1,245,692.  Specification of Letters Patent.  Patented Nov. 6, 1917.

Application filed March 28, 1917. Serial No. 157,970.

*To all whom it may concern:*

Be it known that I, SMITH V. DICKMAN, a citizen of the United States, and a resident of Shavertown, in the county of Delaware and State of New York, have invented a new and Improved Planetary Transmission, of which the following is a full, clear, and exact description.

My invention relates to transmissions of the planetary type. An object thereof is to provide a simple, inexpensive and efficient contrivance which is particularly adaptable for use in conjunction with the Ford transmission.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a fragmentary top plan view of a Ford chassis equipped with an embodiment of my invention;

Fig. 2 is a fragmentary axial section showing the controlling lever;

Fig. 3 is a longitudinal section through my transmission;

Fig. 4 is a cross section on line 4—4, Fig. 3;

Fig. 5 is a similar section on line 5—5, Fig. 3; and

Fig. 6 is a cross section on line 6—6, Fig. 3.

Referring to the drawings, 7 is a driving shaft of the transmission and 8 is the driven shaft. A gear 9 is keyed to the shaft 7 and constitutes the driving member of the transmission. It bears in a bushing 10 carried by the end cover 11 of the transmission casing 12. The cover has an extension sleeve 13 which receives the tubular housing 14 of the shaft 7. The shaft 7 does not extend through the entire length of the gear 9 to afford a bearing for the reduced end 15 of the shaft 8 for which a suitable bushing 16 is provided within the gear 9. The other bearing for the shaft 8 is in the casing 12. A disk 17 is keyed to the shaft 8. A plurality of pins 18 project from the disk toward the gear 9. Said pins are disposed symmetrically on the faces of the disk and each carries a pinion 19 in mesh with the gear 9 and with an interior gear 20 forming part of a clutch 21 slidably mounted on the shaft 8.

The clutch 21 has two coupling elements 22 and 23. The coupling element 22 coöperates with a coupling element 24 provided on the disk 17. The coupling element 23 coöperates with a coupling element 25 forming an integral part of the casing 12. The clutch 21 has a circular groove 26 between the coupling elements engaged by a collar 27. A slide 28 is secured to the collar and projects through the casing by which it is guided to be connected to a controlling rod 29. The controlling rod 29 is connected to an arm 39 extending from a yoke 40 which is operable by a lever 41 and whereby the clutch member 21 may be coupled to either the casing or the disk 17. The slide 28 has a pair of spaced notches 30 engageable by a spring-actuated plunger 31 located in the bearing for the slide and whereby the clutch is maintained in the coupled position with either of the coupling elements.

The casing 12 has an opening near the top thereof closed by a threaded plug 32 through which the housing is filled with lubricant. To facilitate the lubrication of the gear 9 in the bushing 10 a pocket 33 is provided in an extension 34 from the end cover 11 in which the bushing 10 is secured. From this pocket there is a passage 35 through the bushing. (See Fig. 4.) The bushing 10 of the sleeve forming the bearing of the gear 9 has stepped surfaces so that a groove 36 is formed between the gear sleeve and the bushing to collect the lubricant therein. The groove 36 is in communication with the surface of the shaft 8 through a passage 37 in the gear sleeve, and also in the bushing 16 within the gear sleeve.

Passages 38 are provided in the clutch 21 which run from the coupling member 22 toward the central part of the bearing of the coupling on the shaft 8 and through which lubricant finds its way from the casing to the bearing.

When the clutch 21 is coupled to the disk 17 there will be no relative motion between the gear 9 and the gear 20, the two being locked by means of the pinions 19 which are carried by the disk; in consequence, the speed of the shafts 7 and 8 will be the same. On the other hand, when the clutch 21 is coupled to the casing 12 the gear 9 will rotate the pinions 19, the gear 20 remaining stationary. The direction of rotation of the pinions will force the disk 17 to rotate in the same direction with the gear 9 but at a slower speed than gear 9 in view of the difference in diameter between the gears 9 and 20.

When a transmission such as described is interposed between the differential and the transmission of a Ford car, it will permit a further reduction in speed in both directions. The rotary motion of the gears splashes the oil within the casing into the cups or recesses formed on the various parts and connected by channels with the bearing surfaces of the various moving parts therein, thereby assuring perfect lubrication.

While I have described the principle of operation, together with the device which I now consider to be the best embodiment thereof, I desire to have it understood that the device shown is merely illustrative and that such changes may be made as are within the scope of the appended claims.

I claim:

1. In a planetary transmission, a casing, a pair of alining shafts revoluble in the casing, a gear constrained to revolve with one of said shafts, a disk constrained to revolve with the other of said shafts, pinions revoluble on said disk in mesh with the gear, an interior gear in mesh with the pinions mounted to revolve and slide on the shaft with which the disk rotates, and means for coupling the interior gear to the disk or casing while it is in mesh with the pinions.

2. In a planetary transmission, a casing, a pair of alining shafts revoluble in said casing, a gear constrained to revolve with one of said shafts, a disk revoluble with the other of said shafts, pinions revoluble on the disk in mesh with the gear, an interior gear meshing with the pinions and mounted to slide and revolve on the shaft with which the disk is constrained to revolve, said interior gear having a clutch presenting coupling surfaces, said disk having a coupling surface adapted to be engaged by one of the coupling surfaces of the clutch while the interior gear is in mesh with the pinions, said casing having a coupling surface adapted to be engaged by a coupling surface of the clutch when the other coupling surface of said clutch is disengaged from the coupling surface of the disk and while the interior gear is in mesh with the pinions, and means for bringing said coupling surfaces of the clutch into engagement with either the coupling surface or the surface of the disk.

3. In a planetary transmission, a casing having an end cover having an inward extension, a bushing in said extension, a gear having a sleeve bearing in said bushing, a shaft keyed to the gear, a second shaft alining with the first having a bearing in said gear and in the casing, a disk constrained to revolve with said second shaft, pinions revoluble on the disk in mesh with the gear, an interior gear in mesh with the pinions mounted to revolve and slide on said second shaft, and means for sliding said gear, said interior gear having means for coupling with the disk or casing while in mesh with the pinions.

4. In a planetary transmission, a casing having an end cover presenting an inward extension, a bushing in said extension presenting a stepped bearing surface, and a gear having a stepped sleeve bearing in the bushing, the stepped surface of the sleeve and that of the bushing forming an annular groove therebetween, said extension having means for directing lubricant to said groove, said gear having a bearing in said sleeve, said sleeve having means for directing lubricant from the groove to the bearing surface in the sleeve.

SMITH V. DICKMAN.